(12) United States Patent
Moore et al.

(10) Patent No.: US 11,952,212 B2
(45) Date of Patent: Apr. 9, 2024

(54) TRASH COLLECTION MANAGEMENT SYSTEMS AND METHODS

(71) Applicant: Ford Global Technologies, LLC, Dearborn, MI (US)

(72) Inventors: Doug Moore, Southfield, MI (US); Abhishek Sharma, Troy, MI (US); Laura Elliott, Dearborn, MI (US); Raina Kumar, Dearborn, MI (US); Gwen Hickey, Dearborn, MI (US); Jash Patel, Dearborn, MI (US); Angela Ayers, Bloomfield Hills, MI (US); Eric H. Wingfield, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 762 days.

(21) Appl. No.: 17/135,227

(22) Filed: Dec. 28, 2020

(65) Prior Publication Data
US 2022/0204259 A1 Jun. 30, 2022

(51) Int. Cl.
*B65F 5/00* (2006.01)
*B25J 9/16* (2006.01)
(Continued)

(52) U.S. Cl.
CPC ............... *B65F 5/00* (2013.01); *B25J 9/1664* (2013.01); *B25J 11/0085* (2013.01); *G06Q 50/26* (2013.01); *B65F 2210/168* (2013.01)

(58) Field of Classification Search
CPC ..... B65F 5/00; B65F 2210/168; B25J 9/1664; B25J 11/0085
See application file for complete search history.

(56) References Cited

U.S. PATENT DOCUMENTS

2019/0377349 A1* 12/2019 van der Merwe ... G05D 1/0257
2022/0396424 A1* 12/2022 Gwon ........................ B65F 1/14

FOREIGN PATENT DOCUMENTS

KR    101974641 B1    8/2019

OTHER PUBLICATIONS

AbdElminaam et al. "Design and Fabrication Smart Garbage Management and Monitoring System Using Automatic Unloading Robot in Residential Area" International Arab Journal of e-Technology, vol. 5 No. 4 (Jun. 2019) 153-169.
(Continued)

*Primary Examiner* — Gregory W Adams
*Assistant Examiner* — Willie W Berry, Jr.
(74) *Attorney, Agent, or Firm* — Brandon Hicks; Eversheds Sutherland (US) LLP

(57) ABSTRACT

The disclosure generally pertains to systems and methods for trash collection management. In an example embodiment, a dumpster monitoring apparatus may determine that an amount of garbage in a dumpster exceeds a threshold level (such as, for example, above a full-level marked on the dumpster). If the garbage exceeds the threshold level, the dumpster monitoring apparatus automatically transmits a request to a dumpster management apparatus to dispatch a garbage truck. In an example scenario, the dumpster monitoring apparatus may further determine that a current location of the dumpster is stationed is inaccessible to the garbage truck. Consequently, the dumpster monitoring apparatus may automatically transmit a request to a robot vehicle (such as robotic forklift) to move the dumpster from the current location to a new location that is accessible to the garbage truck. The dumpster monitoring apparatus may then inform the dumpster management apparatus of the new location.

16 Claims, 7 Drawing Sheets

(51) Int. Cl.
*B25J 11/00* (2006.01)
*G06Q 50/26* (2012.01)

(56) References Cited

OTHER PUBLICATIONS

Volvo "Garbage Men Are Being Replaced With Robots" (Mar. 2016).
Idwan et al. "Optimal Management of Solid Waste in Smart Cities Using Internet of Things" (Oct. 2019).

\* cited by examiner

TRASH COLLECTION MANAGEMENT SYSTEMS AND METHODS

BACKGROUND

Trash collection in neighborhoods and businesses often involves placement of trash in trash containers that are serviced on a regular basis by garbage trucks. For example, trash placed in trash containers in a residential neighborhood may be picked up by one or more garbage trucks that follow a regular weekly schedule. The trash pickup schedule is typically planned ahead of time by a trash hauling company based on various factors, such as number of available garbage trucks, number of customers to be serviced, and geographical considerations (travel routes, travel distances, etc.). Each customer is typically constrained to this regular schedule and cannot phone in for a garbage truck to stop by and pick up trash during occasional events, such as, for example, after a big party. As a result, a trash container may be full or overflowing in some situations, thereby leading to undesirable conditions, such as unpleasant odors and scavenging critters scattering trash around.

As another example, trash placed in one or more dumpsters by a business entity may be picked up by one or more garbage trucks that follow a somewhat more frequent schedule (bi-weekly, for example). A few examples of such a business entity may include a grocery store, a restaurant, a hotel, a sports venue, and a business convention venue. In some cases, even a bi-weekly trash pickup schedule for a business entity may be insufficient, such as, for example, when a sports event is held in a stadium or a music festival is held in a town square. The trash containers provided for these events may prove inadequate and if left uncleared, may lead to undesirable consequences, such as bad odors and complaints from the public. Additionally restaurants that cannot remove food waste and other trash from their businesses may be required to store that waste on site, which could lead to potential health violations, damage to their image, and therefore damage to their business.

It is therefore desirable to provide solutions that address various shortcomings in conventional trash collection practice, such as the ones described above.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
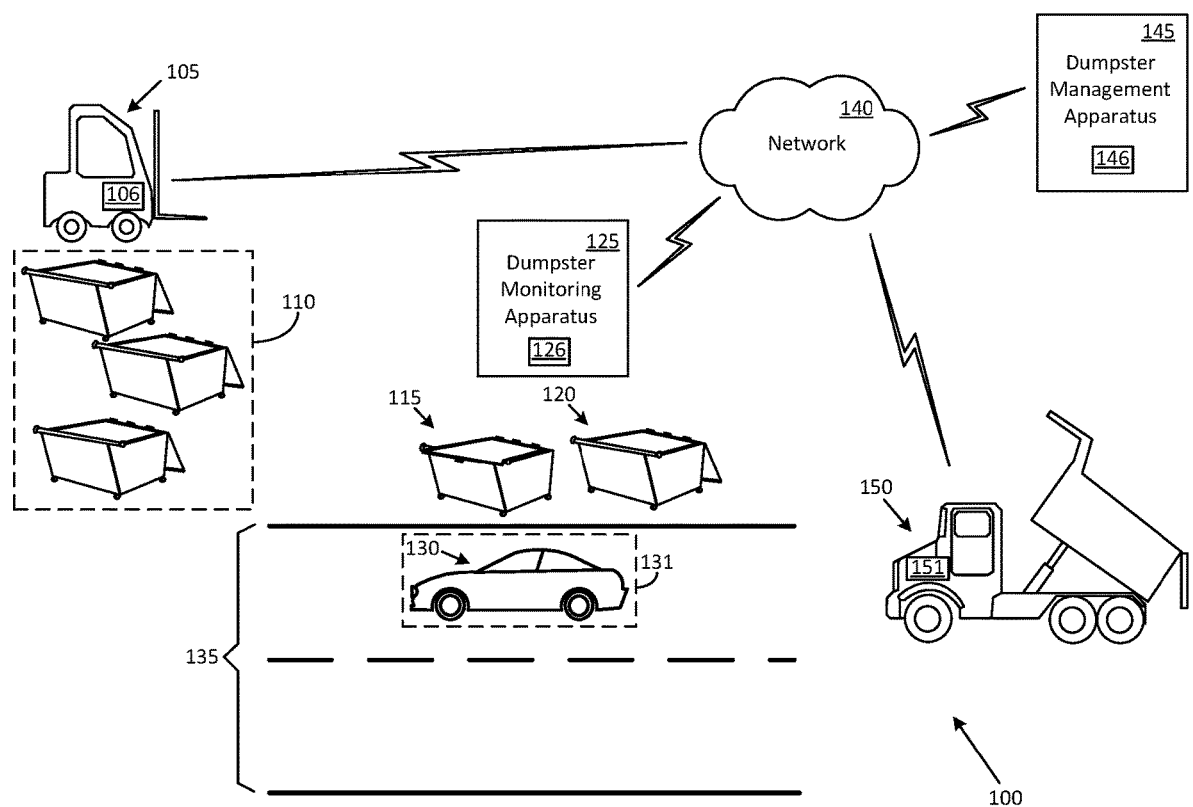
FIG. 1 illustrates an example trash collection management system in accordance with an embodiment of the disclosure.

The systems and methods disclosed herein generally pertain to trash collection management. In an example embodiment, a dumpster monitoring apparatus determines that an amount of garbage in a dumpster exceeds a threshold level. The dumpster monitoring apparatus may include, for example, a camera that captures an image of the dumpster. The image may be evaluated by a processor in order to determine the amount of garbage present in the dumpster and whether the amount of garbage exceeds a threshold level. The threshold level can be a preset threshold level, such as, for example, above a rim of the dumpster, above a full-level marked on the dumpster, or overflowing the dumpster. If the amount of garbage exceeds the threshold level, the dumpster monitoring apparatus may transmit a request to a dumpster management apparatus to dispatch a garbage truck to service the dumpster.

Furthermore, in an example situation, the dumpster monitoring apparatus may determine that a current location at which the first dumpster is stationed is inaccessible to the garbage truck. The dumpster monitoring apparatus may therefore transmit a request to a robot vehicle (a robotic forklift, for example) to move the dumpster from the current location to a new location that is accessible to the garbage truck. For example, the dumpster may be placed in a location that includes a marker (e.g., loading bay 5). In that way, if there is a difference between food waste or if there is a difference in the turnover time of dumpsters that are needed at a particular location, the system can direct a quicker or slower response to picking the dumpster up. The dumpster monitoring apparatus may verify that the dumpster has been moved to the new location and inform the dumpster management apparatus of the new location.

The interactions described above (between the dumpster monitoring apparatus, the robot vehicle, and/or the dumpster management apparatus) may be executed autonomously without human involvement, in accordance with the disclosure.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Certain words and phrases are used herein solely for convenience and such words and terms should be interpreted as referring to various objects and actions that are generally understood in various forms and equivalencies by persons of ordinary skill in the art. More particularly, the word "dumpster" as used herein refers to any of various kinds of trash receptacles and should be understood to encompass various types of items that may be referred to in other ways, such as, for example, a trash can, a trash container, a garbage bin, a rubbish container, a waste receptacle, a recycling bin, and a recycling container. Various actions and activities described herein with reference to a dumpster must be understood to be equally applicable to various activities, particularly trash collection activities, carried out by the various apparatuses described herein upon various kinds of objects used for disposing of trash. Words such as "automatic" or "automatically" as used herein generally imply that an action is carried out by a device without requiring human participation. Words such as "trash," "garbage" and "dumpster" may be used interchangeably for purposes of description herein. Phrases such as "servicing a dumpster" as used herein encompasses various actions such as, for example, emptying a trash receptacle, cleaning out a trash receptacle, lifting/moving a trash receptacle, etc.

FIG. 1 illustrates an example trash collection management system 100 in accordance with an embodiment of the disclosure. The trash collection management system 100 can include a dumpster monitoring apparatus 125 that is communicatively coupled via a network 140 to a dumpster management apparatus 145, a garbage truck 150, and a robot vehicle 105. Each of the dumpster monitoring apparatus 125 and the dumpster management apparatus 145 shown in FIG. 1 is a schematic representation of multiple devices, components and/or systems, some of which are described below in the form of examples.

In an example implementation in accordance with the disclosure, the garbage truck 150 shown in FIG. 1 is a schematic representation of a single garbage truck that is autonomous in some cases and driver-operated in some other cases, and the robot vehicle 105 is a single vehicle that is autonomous.

In another example implementation in accordance with the disclosure, the garbage truck 150 shown in FIG. 1 is a schematic representation of a number of trucks (such as, for example, a fleet of garbage trucks operated by a garbage collection services provider) and the robot vehicle 105 is a schematic representation of a number of robot vehicles (such as, for example, a fleet of robot vehicles operated by the garbage collection services provider and/or provided by other entities such as at an eating establishment or a sports venue).

The dumpster monitoring apparatus 125 can include one or more devices configured to monitor one or more dumpsters such as, for example, to monitor a dumpster 115 and a dumpster 120 that are stationed next to a road 135, which may also include an alley, loading bay, access road, utility road or alley, or the like. The dumpster 115 and the dumpster 120 are two examples that schematically represent any of various types of trash receptacles. The dumpsters may also be moved about or placed next to or within an alley or loading bay. In the case of an alley, one dumpster getting blocked may impact all of the dumpsters in the alley because the garbage truck may not be able to drive around it. On a road, the garbage truck may be able to drive around the dumpster and continue on it route.

More particularly, the dumpster 115 is illustrated as a dumpster having a lid that is closed and can be interpreted for purposes of description herein as a dumpster that is filled with trash and ready for clearing by a garbage truck. The dumpster 120 is illustrated as a dumpster having a lid that is open and can be interpreted for purposes of description herein as a dumpster that is empty (or partially empty) and may be serviced at a later time by a garbage truck.

Additional dumpsters may be stationed in a dumpster holding area 110, which may be provided at any of various locations, such as, for example, in a designated area of a loading dock, a designated area of a warehouse, a rear area of a restaurant, or an area in a manufacturing facility. the dumpster holding area 110 may be used to store empty dumpsters that can be used as replacements for filled dumpsters when needed.

A dumpster may be moved from one place to another by one or more robot vehicles that can move autonomously. Various types of robot vehicles may be employed based on various factors such as, for example, the type of trash that is disposed, the source of the trash (restaurant, mall, sports arena, etc.), and the type of facility in which the robot vehicle is stationed. For example, in one scenario, the robot vehicle may move around on wheels, such as, for example, the robot vehicle 105, which is illustrated as a fork lift.

In some other scenarios, such as, for example, in a warehouse or a manufacturing facility, the robot vehicle 105 can include a fixture such as, for example, a hoist or a crane that is automated and can operate under control of commands issued by a device such as, for example, the dumpster monitoring apparatus 125. The commands may be wireless commands transmitted by any of a controller 126 in in the dumpster monitoring apparatus 125, a controller 146 in the dumpster management apparatus 145, or a controller 151 in the garbage truck 150. The wireless commands may be either propagated to the controller 106 of the robot vehicle 105 directly, or routed through the network 140.

The network 140 may include any one, or a combination of networks, such as a local area network (LAN), a wide area network (WAN), a telephone network, a cellular network, a cable network, a wireless network, and/or private/public networks such as the Internet. For example, the network 140 may support communication technologies such as Bluetooth®, cellular, near-field communication (NFC), Wi-Fi, Wi-Fi direct, machine-to-machine communication, and/or man-to-machine communication.

In an example operation in accordance with the disclosure, the dumpster monitoring apparatus 125 detects that the dumpster 115 is full. The detection procedure may be carried out in various ways, and by using various devices such as, for example, a camera, an infrared sensor, a radar device, and/or a light detection and ranging device. Some of these devices may be mounted on the dumpster 115, while some others may be mounted on fixtures near the dumpster 115 (a pole, a wall, a ceiling, etc.). The camera, when configured for this purpose, may capture one or more images of the dumpster 115. The images may be digital images (such as those captured by a digital camera) and/or videos (such as when the camera is a video camera). The image(s) and/or video (a real time video, in an example implementation) may be evaluated by a processor of the controller 126 in the dumpster monitoring apparatus 125 so as to determine the amount of garbage in the dumpster.

The evaluation, which is directed at determining an amount of garbage present in the dumpster 115, may involve making a determination whether the amount of garbage in the dumpster 115 exceeds a threshold level. The threshold level can be a preset threshold level such as, for example, above a rim of the dumpster 115, above a full-level marked on the dumpster 115, or overflowing the dumpster 115. If the amount of garbage exceeds the threshold level, the dumpster monitoring apparatus 125 may transmit a request to the dumpster management apparatus 145 to dispatch a garbage truck to service the dumpster 115. In some instances, an owner can make a request (or an employee of a restaurant, a city employee, and others as appropriate) for the management apparatus 145 to proactively service the dumpster, thus engaging a robot to replace the dumpster.

The camera of the dumpster monitoring apparatus 125 may be arranged to operate with a field-of-view that encompasses the dumpster 115 and at least a portion 131 of the road 135 located adjacent to the dumpster 115. The portion 131 of the road 135 may be a spot at which the garbage truck 150 typically stops for picking up trash from the dumpster 115. In the illustrated scenario, a vehicle 130 is parked in the portion 131 of the road 135. The dumpster monitoring apparatus 125 evaluates the captured image(s) and/or video and makes a determination that the portion 131 of the road 135 is inaccessible to the garbage truck 150 as a result of the vehicle 130 being parked at that spot. Consequently, the dumpster monitoring apparatus 125 may transmit a request to the robot vehicle 105 to reposition the dumpster 115 from the current location to a new location that is accessible by the garbage truck 150.

The robot vehicle 105 may respond to the request by moving the dumpster 115 to a new location that is accessible by the garbage truck 150. The dumpster monitoring apparatus 125 may then evaluate one or more images (and/or video) that are further captured by the camera, in order to confirm that the dumpster 115 has been moved to the new location. Upon making the confirmation, the dumpster monitoring apparatus 125 may inform the dumpster management apparatus 145 of the new location so as to assist the dumpster management apparatus 145 direct the garbage truck 150 to the new location.

In some cases, the dumpster monitoring apparatus 125 may also transmit a request to the robot vehicle 105 to move an empty dumpster from the dumpster holding area 110 to the vacated location at which the dumpster 115 was previously stationed. The dumpster monitoring apparatus 125 may provide guidance to the robot vehicle 105 to move the empty dumpster from the dumpster holding area 110 to the vacated location at which the dumpster 115 was previously stationed. Other aids such as beacons, painted markings, and signage may be employed to assist the robot vehicle 105 move the empty dumpster 120 (and/or the dumpster 115). The robot vehicle 105 may be equipped with devices such as a camera and/or a navigation system for identifying, receiving, and/or interpreting the beacons, painted markings, signage, etc.

The vehicle 130 described above is merely one example of an object that may render the dumpster 115 inaccessible to the garbage truck 150. Various other objects, such as, for example, another dumpster, an individual, a box, or a package, may render the first location inaccessible to the garbage truck 150 when placed between the dumpster 115 and the portion 131 of the road 135. In some other cases, the dumpster 115 may be inaccessible to the garbage truck 150 for other reasons such as, for example, when the dumpster 115 is stationed at an awkward angle and/or at a distance that is too far from the portion 131 on the road 135. In such cases, the robot vehicle 105 may be provided guidance by the dumpster monitoring apparatus 125 to re-orient and/or move the dumpster 115 so as to render the dumpster 115 accessible to the garbage truck 150.

In the example operation described above, dumpster monitoring apparatus 125 determines that the dumpster 115 is full of trash and executed operations accordingly. In another example operation in accordance with the disclosure, the dumpster monitoring apparatus 125 may determine that the dumpster 115 is not yet full. In this scenario, the dumpster monitoring apparatus 125 may determine a predicted time (hour, day, etc.) at which the dumpster 115 is expected to be full. Determining the time at which the dumpster 115 is expected to be full may be based on various factors, observations, and operations such as, for example, evaluating historic data associated with depositing of trash into the dumpster 115 and/or by observing activity associated with depositing of trash into the dumpster 115. Historic data may be generated by the dumpster monitoring apparatus 125 by using various procedures and techniques associated with recording events and evaluating these events. Some example procedures and techniques may include observing and recording a time of day when trash is typically deposited into the dumpster 115, an amount of trash deposited into the dumpster 115 during each depositing activity, a frequency and/or periodicity of trash depositing (hourly, daily, weekly, routines, for example), and/or a nature of the trash deposited into the dumpster 115 (cardboard boxes, food, small items, large items, etc.).

In some implementations, data gathered by the dumpster monitoring apparatus 125 and/or a result of the determination made by the dumpster monitoring apparatus 125 of the predicted time at which the dumpster 115 will be full, may be transmitted to the dumpster management apparatus 145. The dumpster management apparatus 145 may use such data for performing various tasks such as, for example, dispatching the garbage truck 150 at the predicted time to service the dumpster 115, dispatching the garbage truck 150 on as-needed basis to service the dumpster 115, planning a route schedule and/or a travel route of the garbage truck 150 and/or other garbage trucks.

Route scheduling and route planning of a fleet of garbage trucks of a trash collection services provider may be planned and executed by the dumpster management apparatus 145 in cooperation with other dumpster management apparatuses, based on information obtained from the dumpster monitoring apparatus 125 and/or other dumpster monitoring apparatuses. The various dumpster monitoring apparatuses may be located at various locations in a geographic area that is serviced by the garbage collection services provider.

In some implementations, route planning, route scheduling, and route rescheduling activities may be executed dynamically, such as, for example, on a near-real-time or real-time basis. Dynamic operations applied to trash collection can be beneficial, particularly in situations such as, for example, when a sports event is held in a stadium, or a music festival is held in a town square. The amount of garbage that may accumulate, the rate at which the garbage accumulates, and the short period of times over which the garbage accumulates, in such situations may be significant. Traffic conditions, parking conditions, and lack of access to the dumpsters by garbage trucks are additional factors that may be addressed on a dynamic basis (for example, by using robotic vehicles as described above). In some cases, route planning, route scheduling, and route rescheduling activities may be directed at avoiding garbage pickup at certain times such as during peak traffic conditions around locations where dumpsters are stationed.

Figure 2:
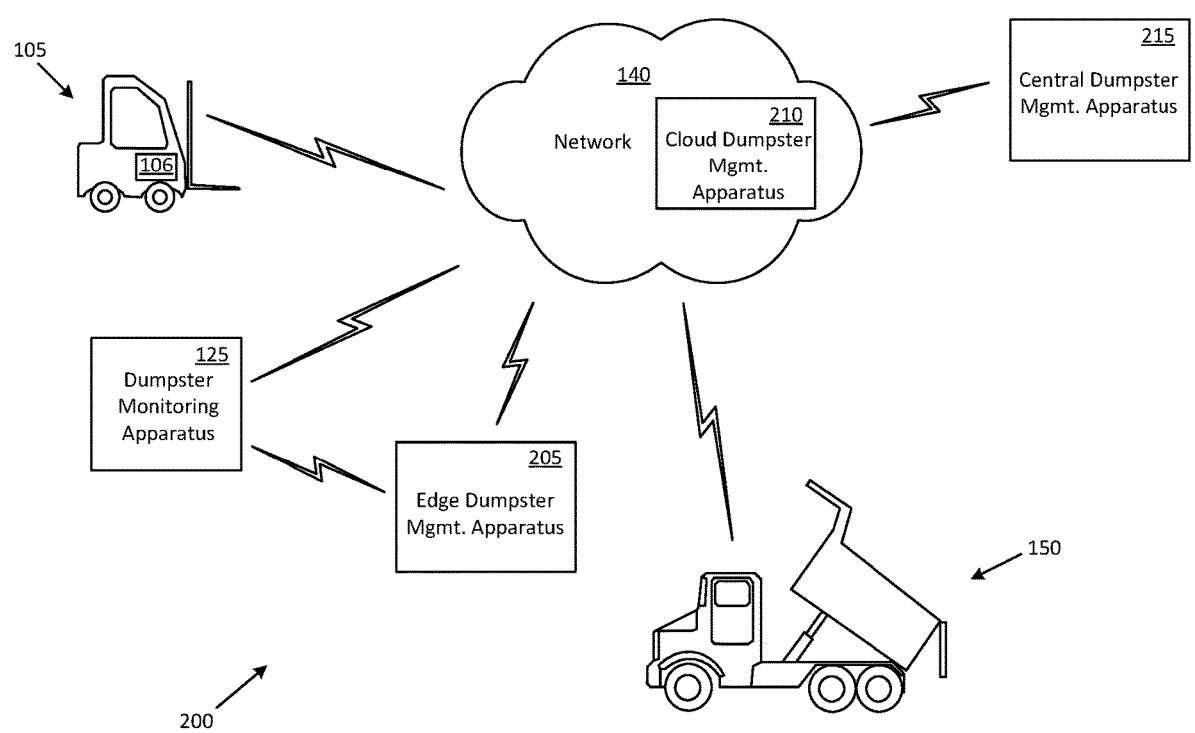
FIG. 2 illustrates another example trash collection management system in accordance with an embodiment of the disclosure.

FIG. 2 illustrates another example trash collection management system 200 in accordance with an embodiment of the disclosure. In this embodiment, the dumpster management apparatus 145 described above is implemented in the form of multiple devices that are geographically dispersed. The multiple devices may include a central dumpster management apparatus 215, a cloud dumpster management apparatus 210, and an edge dumpster management apparatus 205.

Each of the central dumpster management apparatus 215, the cloud dumpster management apparatus 210, and the edge dumpster management apparatus 205 may include one or more computers. Each of the computers can include a processor and a memory containing one or more software programs. The memory is one example of a non-transitory computer-readable medium and the software programs stored in the memory may be provided in the form of computer-executable instructions that can be executed by the processor for executing various operations in accordance with the disclosure.

The edge dumpster management apparatus 205 may be an edge device that is located closer to the dumpster monitoring apparatus 125 than the central dumpster management apparatus 215. In an example configuration, the dumpster monitoring apparatus 125 may be located at the site where the dumpster 115 and the dumpster 120 are located. The dumpster monitoring apparatus 125 may communicate with the edge dumpster management apparatus 205, directly and/or via the network 140.

The cloud dumpster management apparatus 210 may be provided in a network cloud of the network 140 and may include one or more cloud-based computers and cloud-based data storage elements. The dumpster monitoring apparatus 125 may communicate with the cloud dumpster management apparatus 210 for various purposes such as for storing information in the cloud-based data storage elements and/or for obtaining information from the cloud-based data storage elements. The information may be related to garbage collection activities such as, for example, time-related information pertaining to various garbage trucks and information related to one or more trash collection services.

The central dumpster management apparatus 215 may be located at a remote location such as, for example, in a head office of a garbage collection services provider. The central dumpster management apparatus 215 may communicate with the cloud dumpster management apparatus 210, the edge dumpster management apparatus 205, and/or the dumpster monitoring apparatus 125 to obtain information that may be utilized for various purposes such as, for example, to dispatch one or more garbage trucks, to schedule garbage pickup by garbage trucks, to plan routes for garbage trucks, and/or to dynamically route or re-route garbage trucks that are out providing trash hauling services.

In an example operation of the trash collection management system 200, the dumpster monitoring apparatus 125 detects that a dumpster (such as, for example, the dumpster 115) is full and informs the edge dumpster management apparatus 205 of this condition. The edge dumpster management apparatus 205 may perform operations such as updating a dumpster status log to reflect the full status of the dumpster 115, updating a scheduling log to insert information such as an accessibility to the dumpster 115 and if not accessible, an expected time when the dumpster 115 will be accessible by the garbage truck 150.

The edge dumpster management apparatus 205 may convey the information received from the dumpster monitoring apparatus 125 to the cloud dumpster management apparatus 210. The edge dumpster management apparatus 205 may also convey to the cloud dumpster management apparatus 210 additional information such as, for example, identification information of the dumpster 115 (dumpster ID), location information of the dumpster 115 (GPS coordinates, address, landmarks, etc.) and/or a pickup time for the garbage truck 150 to arrive at the location and service the dumpster 115.

The cloud dumpster management apparatus 210 may use the information provided by the edge dumpster management apparatus 205 to instruct the robot vehicle 105 (either directly and/or via the dumpster monitoring apparatus 125) to perform actions such as repositioning the dumpster 115 (if so needed) and/or replacing the dumpster 115 with an empty dumpster (if so desired). In some cases, repositioning the dumpster 115 that is full can involve moving the dumpster 115 to a specific location that may be designated as a disposal hub for garbage pickup. The cloud dumpster management apparatus 210 may further use the information provided by the edge dumpster management apparatus 205 (and other edge dumpster management apparatuses) to schedule and/or dispatch one or more garbage trucks to the location where the dumpster 115 is stationed (and to various other locations).

The robot vehicle 105 may comply with the instructions provided by the cloud dumpster management apparatus 210 by performing actions such as moving to the location where the dumpster 115 is located and verifying that the dumpster is full. The robot vehicle 105 may also determine if the dumpster 115 is accessible by the garbage truck 150. If the dumpster 115 is inaccessible (for example, due to the vehicle 130 being parked in the portion 131 of the road 135), the robot vehicle 105 may inform the cloud dumpster management apparatus 210 of the inaccessibility status. The robot vehicle 105 may then await further instructions from the cloud dumpster management apparatus 210.

If the dumpster 115 is accessible by the garbage truck 150, the robot vehicle 105 may proceed with replacing the dumpster 115 that is full with a dumpster that is empty (such as a dumpster stationed in the dumpster holding area 110).

The robot vehicle 105 may provide information to the cloud dumpster management apparatus 210 and/or the edge dumpster management apparatus 205 upon completion of the task of moving the empty dumpster. The information can include a dumpster ID of the empty dumpster. The robot vehicle 105 may then move back to a designated parking spot and await new instructions from the cloud dumpster management apparatus 210 and/or the edge dumpster management apparatus 205.

If the dumpster 115 is inaccessible by the garbage truck 150, the robot vehicle 105 may move the dumpster 115 to a location that is accessible by the garbage truck and inform the cloud dumpster management apparatus 210 of the new location at which the dumpster 115 is parked and/or a time when the garbage truck 150 can be scheduled to service the dumpster 115. The cloud dumpster management apparatus 210 may instruct the garbage truck 150 to service the dumpster 115 (as a part of a trash pickup schedule and/or along a trash pickup route) based on the information provided by the robot vehicle 105, and/or based on information provided by the dumpster monitoring apparatus 125.

Figure 3:
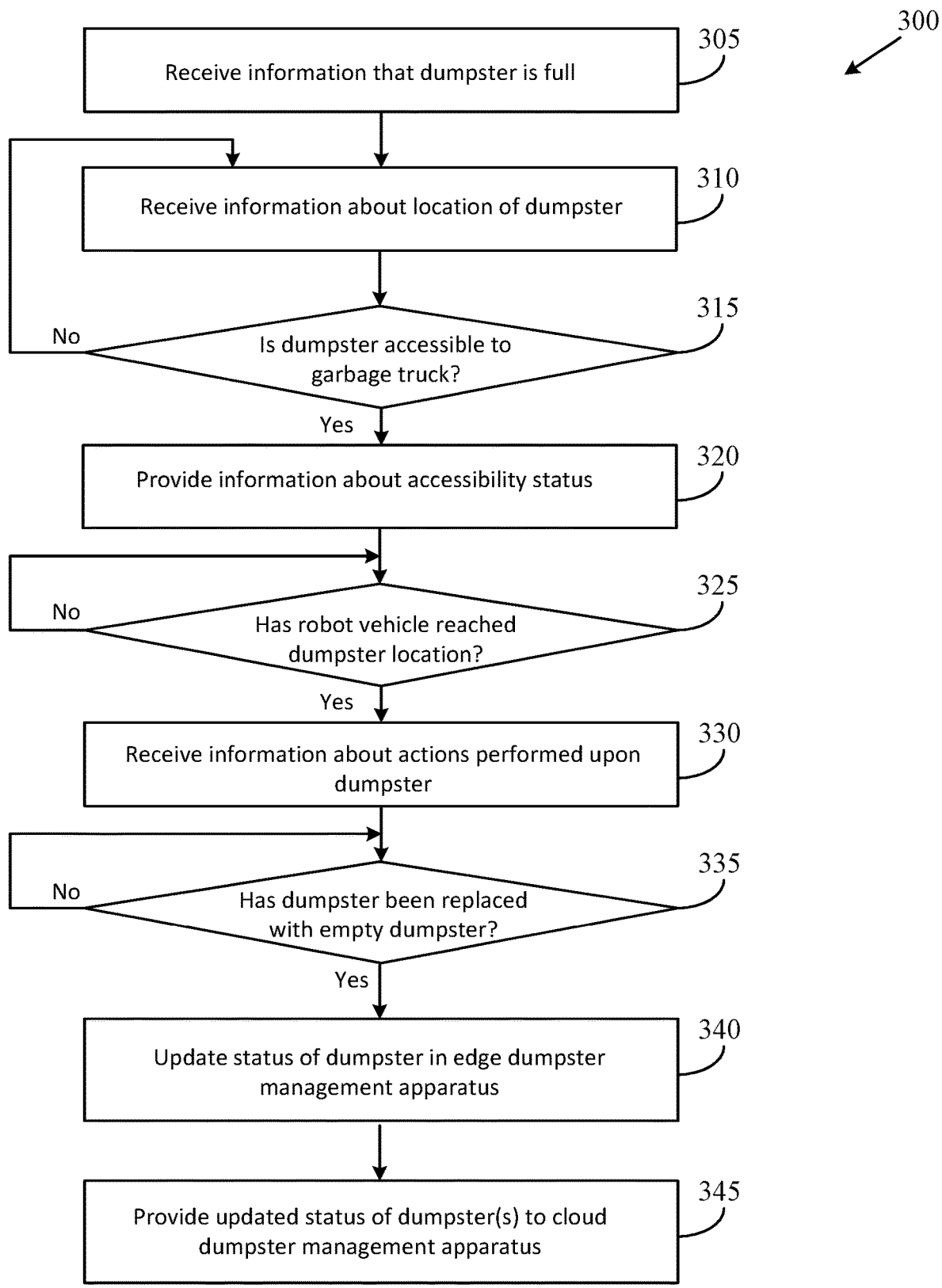
FIG. 3 shows a flowchart of an example method of operation of an edge dumpster management apparatus in accordance with an embodiment of the disclosure.

FIG. 3 shows a flowchart 300 of an example method of operation of the edge dumpster management apparatus 205 in accordance with an embodiment of the disclosure. The flowchart 300 and other flowcharts described herein illustrate a sequence of operations that can be implemented in hardware, software, or a combination thereof. In the context of software, the operations represent computer-executable instructions stored on one or more non-transitory computer-readable media (such as a memory in the edge dumpster management apparatus 205), that, when executed by one or more processors (such as a processor in the edge dumpster management apparatus 205), perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 305, the edge dumpster management apparatus 205 may receive information that the dumpster 115 is full. The information may be provided to the edge dumpster management apparatus 205 by the dumpster monitoring apparatus 125, the dumpster 115, and/or the robot vehicle 105. At block 310, the edge dumpster management apparatus 205 may receive information about the location of the dumpster 115.

At block 315, a determination may be made whether the dumpster 115 is accessible to the garbage truck. If inaccessible, the edge dumpster management apparatus 205 may wait for additional information from the dumpster monitoring apparatus 125, the dumpster 115, and/or the robot vehicle 105, about any actions that may have been carried out to make the dumpster 115 accessible to the garbage truck 150.

If the dumpster 115 is accessible to the garbage truck 150, at block 320, the edge dumpster management apparatus 205 may inform the cloud dumpster management apparatus 210 and/or the central dumpster management apparatus 215 of the accessibility status of the dumpster 115. The edge dumpster management apparatus 205 may then wait for further information from the dumpster monitoring apparatus 125, the dumpster 115, and/or the robot vehicle 105, about actions performed by the robot vehicle 105.

At block 325 a determination may be made whether the robot vehicle 105 has reached the location where the dumpster 115 is stationed. If the robot vehicle 105 has not yet arrived at the location, the edge dumpster management apparatus 205 may continue to wait.

If the robot vehicle 105 has arrived at the location, at block 330, the edge dumpster management apparatus 205 awaits information about actions performed by the robot vehicle 105 upon the dumpster 115.

At block 335, a determination may be made by the edge dumpster management apparatus 205 whether the dumpster 115 has been replaced with an empty dumpster. If not yet replaced, the edge dumpster management apparatus 205 will wait. If action has been taken upon the dumpster 115, such as relocating the dumpster 115 or emptying of the dumpster 115 by the garbage truck 150, at block 340, the status of the dumpster 115 may be updated in a dumpster status record in the edge dumpster management apparatus 205.

At block 345, the edge dumpster management apparatus 205 may inform the cloud dumpster management apparatus 210 and/or the central dumpster management apparatus 215 of the updated status of the dumpster 115.

Figure 4A:
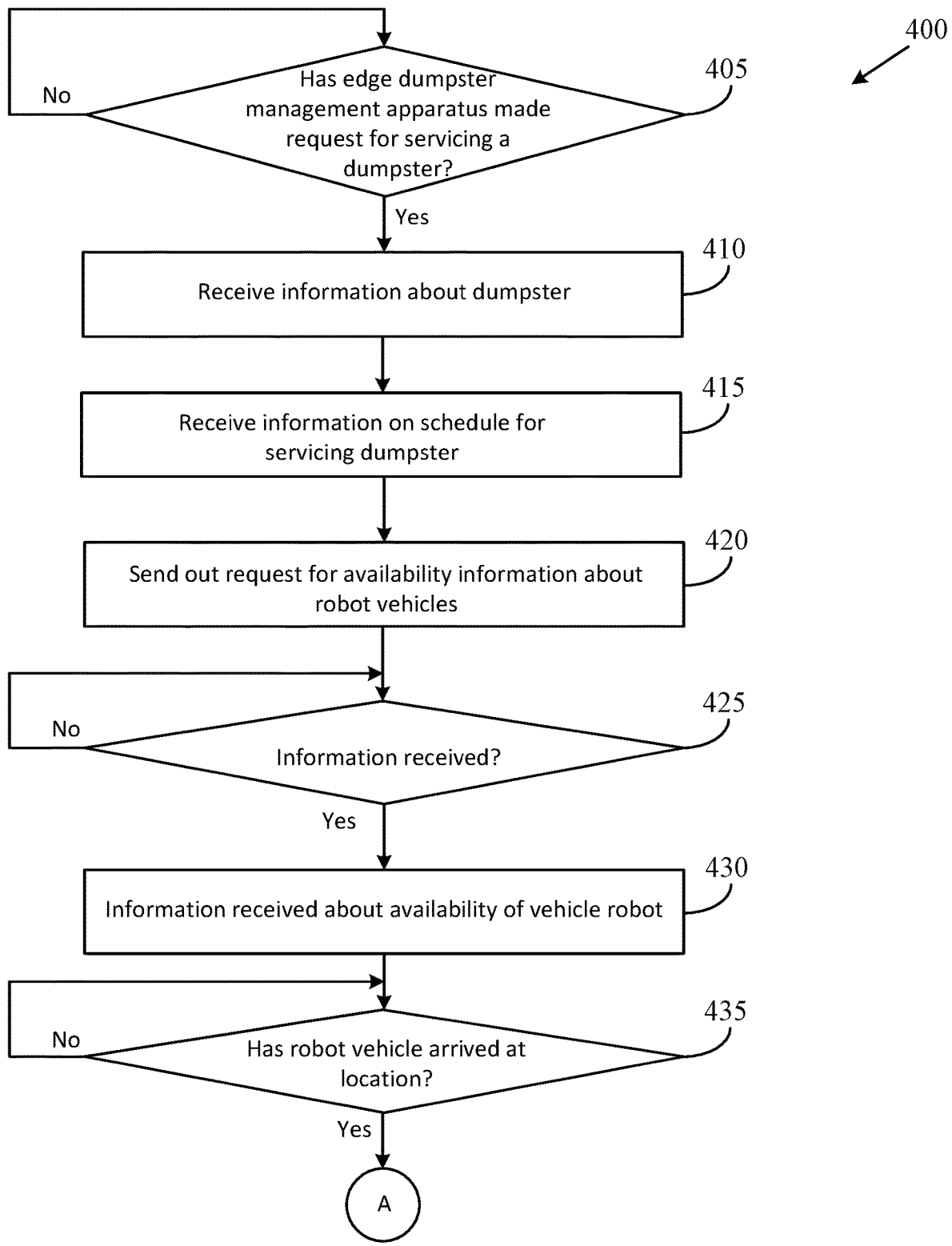
FIGS. 4A and 4B shows a flowchart of an example method of operation of a cloud dumpster management apparatus in accordance with an embodiment of the disclosure.
Figure 4B:
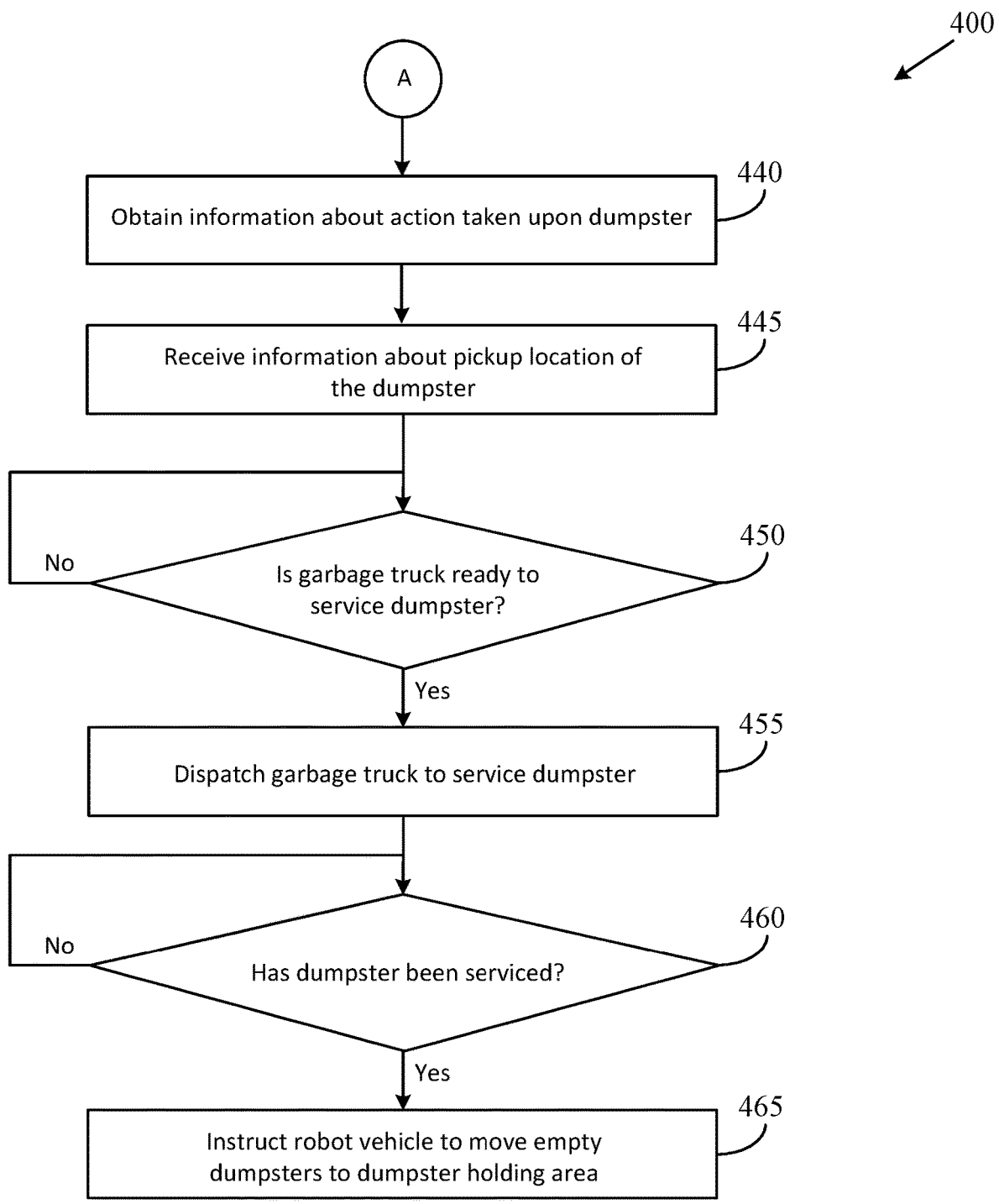

FIGS. 4A and 4B shows a flowchart 400 of an example method of operation of the cloud dumpster management apparatus 210 in accordance with an embodiment of the disclosure. At block 405, a determination is made whether the edge dumpster management apparatus 205 has made a request for servicing of a dumpster such as, for example, the dumpster 115. If no request has been made, the edge dumpster management apparatus 205 continues to wait for a request. If a request has been made, at block 410, the cloud dumpster management apparatus 210 obtains information from the edge dumpster management apparatus 205 about the dumpster 115 (location, fill status, etc.). At block 415, the cloud dumpster management apparatus 210 may obtain information about a schedule for servicing the location in which the dumpster 115 is located.

At block 420, the cloud dumpster management apparatus 210 sends out a request to the edge dumpster management apparatus 205 and/or the robot vehicle 105 to obtain an availability information about robot vehicles such as, for example, the robot vehicle 105.

At block 425, the cloud dumpster management apparatus 210 awaits information from the edge dumpster management apparatus 205.

At block 430, the cloud dumpster management apparatus 210 receives information that the robot vehicle 105 is available and dispatches the robot vehicle 105 to the location at which the dumpster 115 is stationed.

At block 435 a determination is made whether the robot vehicle 105 has arrived at the location and has carried out any action upon the dumpster 115, such as moving the dumpster 115 to an accessible location.

If the robot vehicle 105 has arrived at the location and has carried out an action upon the dumpster 115, at block 440, information about the action taken upon the dumpster 115 may be obtained.

At block 445, the cloud dumpster management apparatus 210 may receive details about the pickup location of the dumpster 115.

At block 450, the cloud dumpster management apparatus 210 may make a determination whether the garbage truck 150 is ready to service the dumpster 115.

At block 455, the cloud dumpster management apparatus 210 may dispatch the garbage truck 150 to service the dumpster 115 at the scheduled time.

At block 460 a determination is made whether the dumpster 115 has been serviced. If the dumpster 115 has been serviced, at block 465, the cloud dumpster management apparatus 210 may instruct the robot vehicle 105 to move one or more empty dumpsters to the dumpster holding area 110.

Figure 5A:
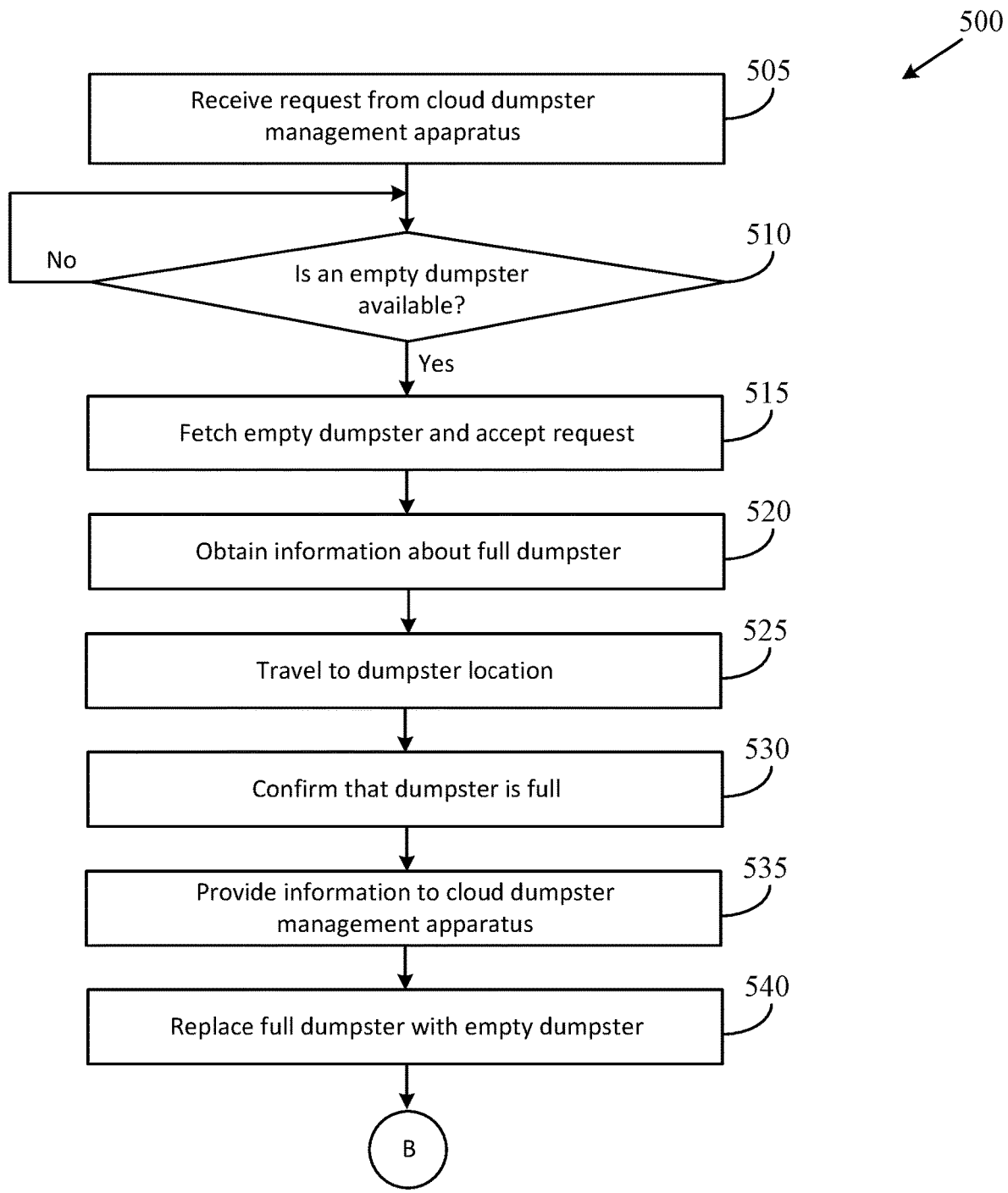
FIGS. 5A and 5B shows a flowchart of an example method of operation of a robot vehicle in accordance with an embodiment of the disclosure.
Figure 5B:
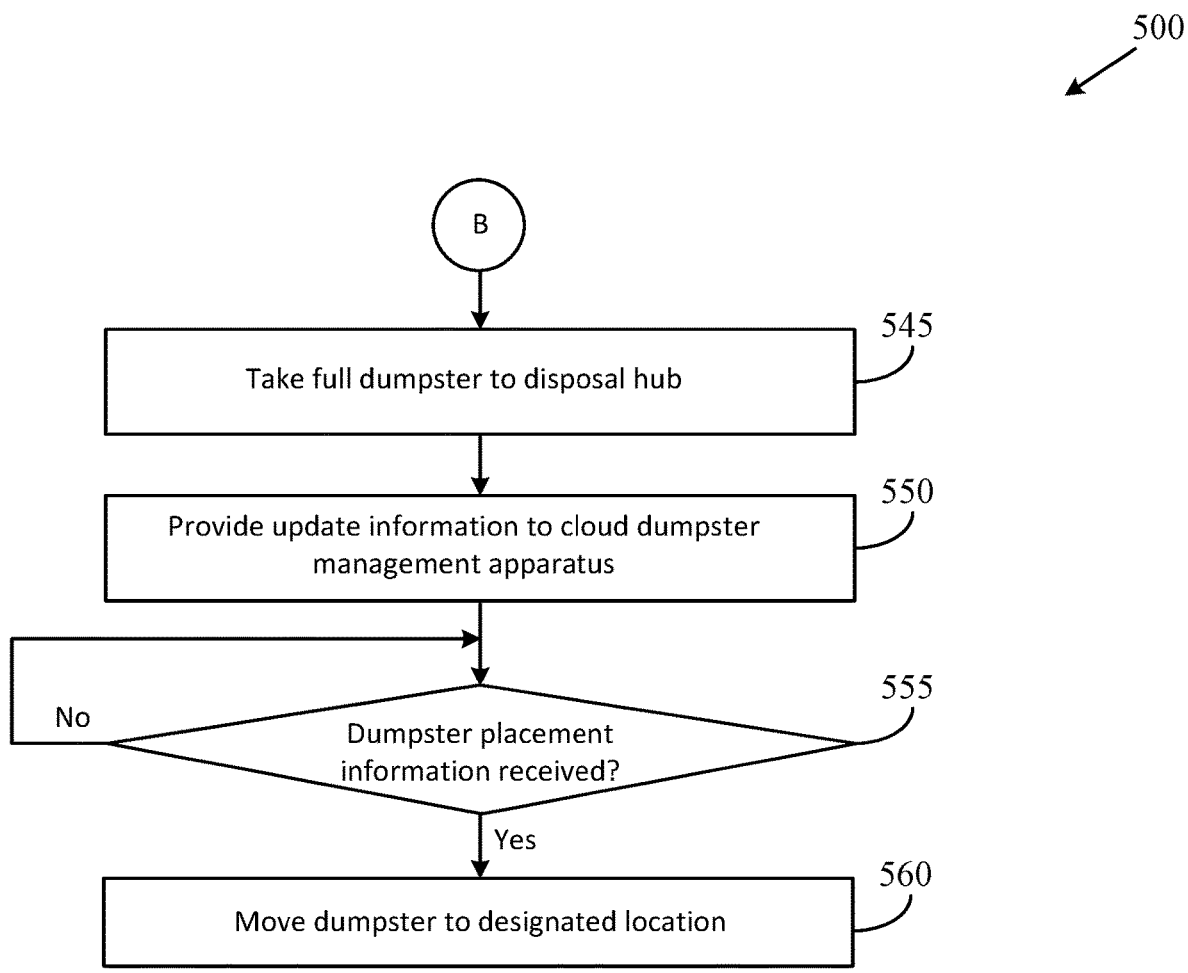

FIGS. 5A and 5B shows a flowchart 500 of an example method of operation of the robot vehicle 105 in accordance with an embodiment of the disclosure. At block 505, the robot vehicle 105 receives a request from the cloud dumpster management apparatus 210 pertaining to a dumpster.

At block 510, the robot vehicle 105 may make a determination whether an empty dumpster is available. If an empty dumpster is available, such as, for example, an empty dumpster in the dumpster holding area 110, at block 515, the robot vehicle 105 may fetch the empty dumpster and accept the request made by the cloud dumpster management apparatus 210.

At block 520, the robot vehicle 105 may obtain information about a dumpster that is full, such as, for example, the dumpster 115.

At block 525, the robot vehicle 105 may travel to the location of the dumpster 115.

At block 530, the robot vehicle 105 may confirm that the dumpster 115 is full.

At block 535, the robot vehicle 105 may provide information about the full condition of the dumpster 115 to the cloud dumpster management apparatus 210.

At block 540, the robot vehicle 105 may replace the dumpster 115 that is full with an empty dumpster.

At block 545, the robot vehicle 105 may take the dumpster 115 to a location such as a disposal hub, for servicing by a garbage truck.

At block 550, the robot vehicle 105 may provide updated information about the dumpster 115 and/or the empty dumpster, to the cloud dumpster management apparatus 210.

At block 555 a determination may be made whether the cloud dumpster management apparatus 210 has sent instructions for placement of the dumpster 115 after the dumpster 115 has been serviced by the garbage truck 150. If no instructions have been provided, the robot vehicle 105 awaits a request from the cloud dumpster management apparatus 210 for a new task.

If the cloud dumpster management apparatus 210 provides instructions pertaining to placement of the dumpster 115, at block 560, the robot vehicle 105 may move the dumpster 115 to a location designated by the cloud dumpster management apparatus 210.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the dumpster monitoring apparatus 125 and/or in the dumpster management apparatus 145 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining, by a dumpster monitoring apparatus, that an amount of garbage in a dumpster exceeds a threshold level;
   transmitting, to a dumpster management apparatus, upon determining that the amount of garbage in the dumpster exceeds the threshold level, a request to dispatch a garbage truck to service the dumpster;
   determining, by the dumpster monitoring apparatus, whether the dumpster has been serviced by the garbage truck;
   determining, by the dumpster monitoring apparatus, that a first location at which the dumpster is stationed is inaccessible to the garbage truck;
   transmitting, to a robot vehicle, a first request to move the dumpster from the first location to a second location that is accessible to the garbage truck;
   determining, by the dumpster monitoring apparatus, that the robot vehicle has moved the dumpster from the first location to the second location; and
   informing the dumpster management apparatus of the second location along with the request to dispatch the garbage truck to service the dumpster.

2. The method of claim 1, further comprising:
   transmitting, to the robot vehicle, after determining that the robot vehicle has moved the dumpster from the first location to the second location, a second request to move an empty dumpster from a dumpster holding area to the first location.

3. The method of claim 2, further comprising:
   transmitting, to the robot vehicle, guidance for placing the empty dumpster at the first location.

4. The method of claim 1, wherein determining that the first location is inaccessible to the garbage truck comprises detecting an object placed between the dumpster and a parking spot for the garbage truck to service the dumpster.

5. The method of claim 1, further comprising:
   determining, by the dumpster monitoring apparatus, that the amount of garbage in the dumpster is below the threshold level; and
   transmitting, to the dumpster management apparatus, a predicted time at which the amount of garbage in the dumpster is expected to exceed the threshold level.

6. The method of claim 5, further comprising:
   determining the predicted time based on evaluating historic data associated with placement of trash into the dumpster and/or observing activity associated with placement of trash into the dumpster.

7. A method comprising:
   receiving, from a dumpster monitoring apparatus, a request to dispatch a garbage truck to service a first dumpster stationed at a first location;
   transmitting, to the dumpster monitoring apparatus, a request to provide information comprising an accessibility to the first location by the garbage truck;
   receiving, from the dumpster monitoring apparatus, information comprising the accessibility to the first location by the garbage truck; and
   dispatching the garbage truck to the first location, subject to the first location being accessible by the garbage truck,
   wherein the first location is accessible to the garbage truck, the method further comprising:
      transmitting, to the garbage truck, an instruction to travel on a first pickup route that includes a stop for servicing the first dumpster;
      receiving, from the dumpster monitoring apparatus, information that an object has rendered the first location temporarily inaccessible to the garbage truck; and
      receiving, from the dumpster monitoring apparatus, a request to schedule an arrival of the garbage truck at the first location at a first time after the object has been moved and the first location becomes accessible.

8. The method of claim 7, wherein the first location is inaccessible to the garbage truck, the method further comprising:
   transmitting, to a robot vehicle, a first instruction to move the first dumpster from the first location to a second location that is accessible to the garbage truck; and
   dispatching the garbage truck to the second location upon receiving a confirmation from the robot vehicle that the first dumpster has been moved to the second location.

9. The method of claim 8, further comprising:
   determining a route schedule and/or a travel route of the garbage truck based on receiving the confirmation from the robot vehicle that the first dumpster has been moved to the second location.

10. The method of claim 8, further comprising:
    transmitting, to the robot vehicle, a second instruction to replace the first dumpster with a second dumpster that is stationed in a dumpster holding area.

11. The method of claim 7, further comprising:
    providing, to the dumpster monitoring apparatus, a status update of the garbage truck traveling on the first pickup route.

12. A system comprising:
    a robot vehicle;
    a dumpster monitoring apparatus; and
    a dumpster management apparatus comprising a first computer that includes a memory that stores computer-executable instructions and a processor configured to access the memory and execute the computer-executable instructions to at least:
    receive from the dumpster monitoring apparatus, a request to dispatch a garbage truck to service a dumpster stationed at a first location;
    transmit to the dumpster monitoring apparatus, a request to provide information comprising an accessibility to the first location by the garbage truck;

receive from the dumpster monitoring apparatus, information comprising the accessibility to the first location by the garbage truck;

dispatch the garbage truck to the first location, subject to the first location being accessible by the garbage truck;

receive from the dumpster monitoring apparatus, information that the first location is inaccessible to the garbage truck;

transmit to the robot vehicle, a first instruction to move the dumpster from the first location to a second location that is accessible to the garbage truck; and dispatch the garbage truck to the second location upon receiving a confirmation from the robot vehicle that the dumpster has been moved to the second location.

13. The system of claim 12, wherein the dumpster monitoring apparatus comprises a sensor provided in the dumpster, a camera arranged to include a field of view of the dumpster, a radar device, an infrared sensor, and/or a light detection and ranging device.

14. The system of claim 12, wherein the robot vehicle is one of a robotic forklift, a hoist, or a crane.

15. The system of claim 12, wherein the first computer is an edge apparatus that is configured to cooperate with a second computer that is communicatively coupled to the edge apparatus through a network.

16. The system of claim 15, wherein the second computer is a cloud computer.

* * * * *